UNITED STATES PATENT OFFICE 2,589,980

1-AMINO 4-BICYCLOHEXYLAMINO ANTHRA-QUINONE 2-SULFONIC ACIDS

Samuel von Allmen and Hans Eggenberger, Basel, Switzerland, assignors to Sandoz A. G., Basel, Switzerland, a Swiss firm No Drawing. Application May 23, 1949, Serial No. 94,935. In Switzerland January 28, 1948

4 Claims. (Cl. 260—374)

The present invention relates to new and valuable blue acid dyestuffs of the anthraquinone series.

In U. S. Patent No. 1,821,043 there is described that dyestuffs of the general formula

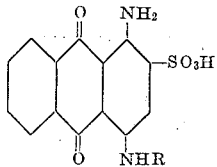

wherein R stands for a hydroaryl radical, dye wool in exceedingly clear blue shades. These dyeings, however, are not fast to milling.

It has now been found that the new dyestuffs of the present invention which correspond to the general formula

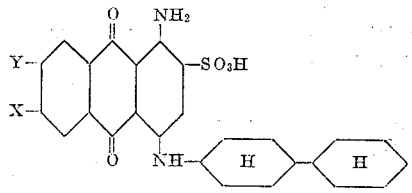

wherein Y and X stand for H, Cl or Br, yield blue shades of remarkable clearness and brightness and which are further characterized by their excellent milling and bleaching fastness properties and their good dyeing properties even when applied from a neutral dye-bath. The extraordinary good fastnesses to milling and to bleaching could not have been expected and is surprising. As a matter of fact dyestuffs which have an analogous constitution but which are substituted in the 4-position of the anthraquinone nucleus by other hydroaryl radicals like

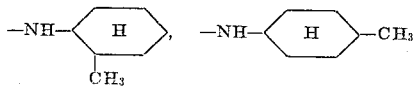

or

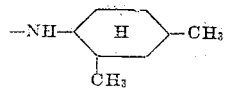

produce tints without any remarkable milling fastness.

The manufacture of the new dyestuffs can be effected according to conventional methods by condensing an anthraquinone compound of the general formula

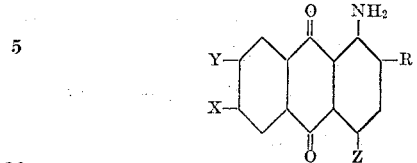

wherein R stands for Cl, Br or SO$_3$H, Z may be Cl or Br and Y and X stand for H, Cl or Br, with p-aminobicyclohexyl, 3.2 parts of potassium hy-resents Cl or Br, the reaction product will have to be treated for example with an alkali metal sulphite in order to replace the halogen group by the sulphonic acid group.

The following examples, without being limitative, illustrate the present invention, the parts being by weight.

Example 1

9.4 parts of the potassium salt of 1-amino-4-bromanthraquinone-2-sulphonic acid, 10 parts of p-amino-bicyclohexyl, 3.2 parts of potassium hydroxide, 0.2 part of copper powder, 0.2 part of cuprous chloride and 150 parts of a 38% solution of the sodium salt of xylene-sulphonic acid in water are heated while stirring, if desired with introduction of nitrogen, at a temperature of 65° C. The reaction is complete when the coloration of a sample diluted with a mixture of ethanol and water undergoes no further change. The excess of amine is neutralised by addition of hydrochloric acid and the dyestuff separated in the usual manner.

If the potassium salt of 1-amino-4-broman-thraquinone-2-sulphonic acid is replaced by the potassium or sodium salt of 1-amino-4-chloro-anthraquinone-2-sulphonic acid, the same dyestuff will be obtained.

Example 2

9.5 parts of 1-amino-2.4-dibromanthraquinone, 0.4 part of copper acetate and 80 parts of p-amino-bicyclo-hexyl are heated at 80–120° C. while stirring and causing nitrogen to pass through the mass. The condensation is finished, if the samples taken out give no further alteration of the shade on dilution with ethanol. The thus obtained condensation product which contains in the 2-position of the anthraquinone nucleus a bromine atom is subsequently treated with an alkali metal sulphite, preferably under pressure, whereupon a dyestuff identical with that of Example 1 is obtained.

Example 3

19.6 parts of the potassium salt of 1-amino-4-bromo-6.7- dichloro - anthraquinone-2-sulphonic acid, 20 parts of p-aminobicyclohexyl, 5 parts of caustic soda lye 30%, 1 part of copper powder and 500 parts of a 38% solution of the sodium salt of xylene-sulphonic acid in water are heated while stirring at 60-70° C. for 20 hours. The mass turns to blue. When the reaction is complete, the dyestuff is isolated in the same manner as disclosed in the previous examples. It is soluble in water with a brilliant blue shade and in concentrated sulphuric acid without a noticeable coloration. An addition of some p-formaldehyde to the latter solution effects the formation of a greenish-blue color.

The dyestuff dyes animal fibres and nylon in a vivid pure blue shade which is somewhat more greenish than the shade obtainable with the dyestuffs of Examples 1 and 2. The dyeings possess an excellent fastness to milling; furthermore the dyestuff, on account of its good affinity, can be applied in a neutral dye-bath.

A similar dyestuff will be obtained if, instead of 1-amino-4-bromo-6.7- dichloranthraquinone-2-sulphonic acid, the 6.7-dibromo-derivative is used.

Example 4

11 parts of the sodium salt of 1-amino-4-bromo-7- chloranthraquinone-2- sulphonic acid, 13.5 parts of p-aminobicyclohexyl, 10 parts of caustic soda lye 30%, 0.3 part of cuprous chloride and 150 parts of water are heated to 60-70° C. for 36 hours whilst stirring.

The reaction mass turns blue. The dyestuff can be isolated as described in the preceding examples. It is soluble in water with a bright-blue coloration, in concentrated sulphuric acid with a slightly yellow coloration which turns to greenish-blue on addition of some p-formaldehyde.

The dyestuff has a shade similar to that of Example 3.

Example 5

A similar dyestuff as in Example 4 can be obtained by causing 10.4 parts of 1-amino-2.4-dibromo-6-chloranthraquinone to react at a temperature of 80-120° C. with 2.5 parts of anhydrous sodium acetate, 0.4 part of copper acetate and 80 parts of p-amino-bicyclohexyl while stirring and introducing a slow current of nitrogen until the formation of the condensation product has completed. Thereupon it is isolated and treated with an alkali metal sulphite, preferably under pressure.

What we claim is:

1. An acid anthraquinone dyestuff of the formula

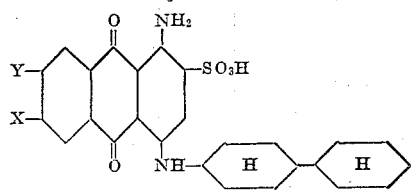

wherein X stands for a member selected from the group consisting of H, Cl and Br, and wherein Y stands for a member selected from the group consisting of Cl and Br, when X denotes H, and for a member selected from the group consisting of H, Cl and Br, when X denotes Cl or Br.

2. The acid anthraquinone dyestuff of the formula

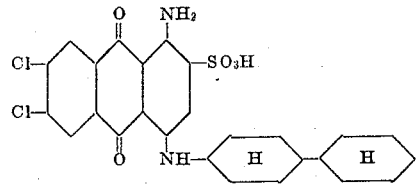

3. The acid anthraquinone dyestuff of the formula

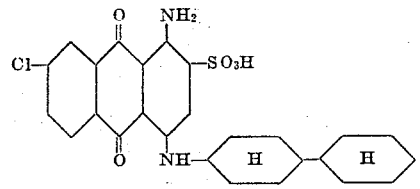

4. The acid anthraquinone dyestuff of the formula

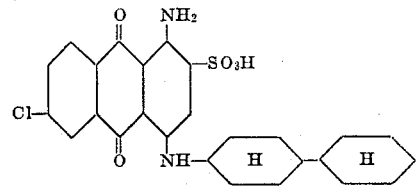

SAMUEL VON ALLMEN.
HANS EGGENBERGER.

REFERENCES CITED

The following references are of record in the file of this patent:

UNITED STATES PATENTS

| Number | Name | Date |
|---|---|---|
| 1,821,043 | Weinand | Sept. 1, 1931 |
| 2,426,547 | Buckley et al. | Aug. 26, 1947 |

FOREIGN PATENTS

| Number | Country | Date |
|---|---|---|
| 381,954 | Great Britain | Oct. 3, 1932 |